United States Patent [19]

Guy et al.

[11] Patent Number: 5,485,954
[45] Date of Patent: Jan. 23, 1996

[54] REDUCED PROFILE THERMOSTAT

[75] Inventors: Stephen E. Guy, Longview, Tex.;
Louis E. Sulfstede, Ft. Wayne, Ind.;
Eric Hillmer, Toronto, Canada

[73] Assignee: American Standard Inc., Piscataway, N.J.

[21] Appl. No.: 258,000

[22] Filed: Jun. 10, 1994

[51] Int. Cl.⁶ .............................. F24F 3/14; H01H 37/04
[52] U.S. Cl. ...................... 236/78 R; 236/46 R; 337/398
[58] Field of Search ............................... 236/46 R, 78 R, 236/68 D; 165/12

[56] References Cited

U.S. PATENT DOCUMENTS

| | | | |
|---|---|---|---|
| D. 271,380 | 11/1983 | Zanazzo et al. | D10/49 |
| D. 273,466 | 4/1984 | Lawrence et al. | D10/50 |
| D. 310,177 | 8/1990 | Bensoussan et al. | D10/50 |
| D. 317,267 | 6/1991 | Mehta | D10/50 |
| D. 326,234 | 5/1992 | Tinz | D10/50 |
| D. 329,617 | 9/1992 | Tinz | D10/51 |
| D. 333,656 | 3/1993 | Bluemel et al. | D13/162 |
| 4,257,555 | 3/1981 | Neel | 236/94 |
| 5,107,918 | 4/1992 | McFarlane et al. | 165/12 |

FOREIGN PATENT DOCUMENTS 2176631 12/1986 United Kingdom ................. 236/46 R

OTHER PUBLICATIONS

Title: "Control Panels Rooftop Single Zone Air Conditioners"; Literature File No: WAHA-S-1B; Date: Mar., 1977.

Primary Examiner—William E. Wayner
Attorney, Agent, or Firm—William J. Beres; William O'Driscoll; Peter D. Ferguson

[57] ABSTRACT

A thermostat that includes a subbase having a back surface designed to be mounted conformal with a surface and an inner surface that has a portion of selected electrical components mounted thereon, including a first electrical communication device. The subbase has first mechanical connectors formed integral therewith. A cover that has a front surface designed to carry selected components for communication with an operator and an inner surface that has a portion of selected electrical component supported thereby, including a second electrical communication device. The inner surface has second mechanical connectors formed integral therewith. During installation, the cover is brought into registry with the subbase to form a thermostat housing that has a reduced profile and that substantially encloses the electrical components of the thermostat. The first electrical communication device is mated with the second electrical communication device and the first mechanical connectors are mated to the second mechanical connectors by motion of the cover with respect to the subbase that is substantially conformal to the back surface of the subbase as the cover is brought into registry with the subbase.

15 Claims, 2 Drawing Sheets

REDUCED PROFILE THERMOSTAT

TECHNICAL FIELD

The present invention relates to sensors utilized to sense the temperature of a zone for control of a heating, ventilation, and air conditioning (HVAC) system. More specifically, it relates to a flush, wall mounted thermostat of reduced profile having a cover and a subbase that include connectors mounted therein that are oriented substantially coplanar with the planes of the cover and subbase and facilitate the slideable engagement thereof by motion parallel to such planes.

BACKGROUND OF THE INVENTION

Thermostats have long been used to control HVAC systems. Such thermostats are typically mounted flush on a wall in the space or zone that is being heated or air conditioned at approximately five feet of height from the floor. Aesthetic considerations exert a major influence on the design of thermostats that are to be used in occupied zones and spaces, including homes and office spaces. For such uses, it is desirable that the thermostat be as unobtrusive as possible. A principle consideration is that the thermostat project from the mount on the wall into the space as little as possible. From the standpoint of acceptance in the marketplace, a thermostat having a minimal profile, as measured between the wall on which the thermostat is mounted and the outer surface of the cover, is much preferred over a thick thermostat the provides the same functional capabilities.

A minimal profile thermostat has both functional and safety advantages, as well as being aesthetically pleasing. For instance, such a thermostat is less likely to be accidentally bumped by traffic in the room in which the thermostat is installed. The impact of such inadvertent contact may be enough to dislodge the thermostat from its mount on the wall or to dislodge the cover from the subbase.

More particularly, thermostats typically have the cover and subbase formed from a polymeric material. Both the cover and the sub-base have electronic components affixed thereto that must be electrically connected when the cover is engaged to the subbase. There are also mechanical connectors that cooperatively engage to mate the cover to the subbase. The mechanical connectors between the cover and the subbase are typically formed integral to the cover and subbase during the formation process and are therefore made of the same material. Such material is a very serviceable material under ordinary conditions, but may not have the strength to be able to withstand the force of a sharp blow. Such a blow may break the mechanical connectors, preventing the cover from being reconnected to the subbase or pull the anchors from the wall on which the thermostat is mounted and pull out the electrical connections from the thermostat to the HVAC system. Additionally, the electrical connections may be disturbed by such a blow, rendering the operator controls that are typically mounted on the cover inoperable.

All of the above described consequences of an impact to a protruding thermostat result in the thermostat being at least temporarily inoperable. An inoperable thermostat can have serious consequences, especially during spells of extreme cold. Since the heating unit of the building is controlled by the thermostat, an inoperable thermostat usually results in the loss of all heat to the building. During such spells, HVAC repair personnel are typically overtaxed and it might be several days before a failed thermostat can be repaired.

Thermostats typically have a connecting block affixed to the subbase. The connecting block is utilized to connect the wires from the HVAC system to the thermostat. During installation, the wires from the HVAC system are brought through an opening in the subbase and the subbase is then mounted on the wall. The wires are then connected to the connecting block. The majority of the electronic components of the thermostat are typically affixed to the cover. This facilitates the ready removal and installation of the cover onto the subbase without disturbing the wire connections.

Currently, thermostats having electronic components in generally two opposed portions of the thermostat to be mated together as described above are designed to be mated in the plane that is perpendicular to the plane of the opposed portions. This usually results in the subbase being firmly affixed to the wall. The opposed portion is then positioned spaced apart from the subbase and aligned therewith. A pushing motion toward the wall on which the subbase is mounted and perpendicular to the plane of the subbase, coupled with a relatively firm force is required to simultaneously engage the opposed portion and the subbase both mechanically and electrically. In such thermostats, the electrical connectors and the mechanical connectors are oriented to engage in a plane that is perpendicular to the wall on which the thermostat is mounted. Such orientation contributes substantially to the overall profile of the thermostat.

The thermostat that is the subject of U.S. Pat. No. 5,107,918 is typical of the current designs. The '918 device has a subbase, an opposed portion, and a hinged cover. The cover does not have any electronic devices incorporated therein. The electrical communication means and the mechanical coupling means are designed to be engaged with cooperating electrical communication means and mechanical coupling means formed in the opposing portion by the above described procedure.

The electrical communication means of the '918 device are typical of electrical connectors that are utilized in such applications. As depicted, the electrical communication means are: relatively long and are oriented in a plane that is perpendicular to the plane of the subbase. With such orientation, the profile of the thermostat is affected by the length of the electrical communication means. At one extreme, the profile absolutely can be no more narrow than the length of the electrical communication means. Practically, the thermostat must have a substantially greater depth of profile than the length of the electrical communication means in order to accommodate the other components of the thermostat that are aligned with the electrical communication means and are interposed between the subbase and the cover.

It would be a decided advantage in the HVAC industry to have a thermostat having a minimal profile. The advantage would evidence itself in appeal to the consumer as well as in the areas of functionality and safety. The minimum profile thermostat should be easily mounted on a plane surface, such as a wall, and it should provide for easy assembly and disassembly of the major components of the thermostat, such as the cover and subbase.

SUMMARY OF THE INVENTION

The present invention meets the objective of having a thermostat having a minimal profile. The present invention meets this objective by orienting the mechanical and electrical connectors conformally with the back surface of the subbase. A mating engagement of the cover and the subbase is effected by a motion that is conformal to the back surface of the subbase. Preferably, the subbase is fixedly mounted to the wall and the cover is positioned slightly above the subbase and brought into lateral registry with the subbase. The cover is then lowered into a position of registry with the subbase. As the cover is lowered, the electrical and mechanical connectors in the cover are guided into simultaneous engagement with the mechanical and electrical connectors in the subbase. Both the electrical and mechanical connectors are designed to be readily engaged and disengaged as desired. By orienting the lengthy electrical connectors conformal with the back surface of the subbase and cover, the profile of the thermostat is capable of being substantially reduced as compared to conventional thermostats. Such thermostats deploy the electrical connectors in the conventional orientation that is generally perpendicular to the back surface of the subbase.

The present invention comprises a thermostat that is designed to control the temperature in an area. The thermostat includes selected components for sensing the temperature and for communicating between an operator and a HVAC system.

The thermostat further includes a subbase having a back surface that is designed to be mounted conformally with a surface and an inner surface that has a portion of the selected components for effecting control of the HVAC system mounted thereon, such components portion including a first electrical communication device. The subbase has first mechanical connectors formed integral therewith.

The thermostat has a cover that has a front surface designed to carry selected components for communication with the operator and an inner surface that has a portion of the selected components for effecting control supported thereby. The portion of the selected components for effecting control includes a second electrical communication device. The second inner surface has second mechanical connectors formed integral therewith.

The cover is brought into registry with the subbase to form a thermostat housing that has a reduced profile and that substantially encloses the sensing and communicating components of the thermostat. The first electrical communication device is mated with the second electrical communication device and the first mechanical connectors are mated to the second mechanical connectors by motion of the cover with respect to the subbase that is substantially conformal with the back surface of the subbase as the cover is brought into registry with the subbase.

DETAILED DESCRIPTION OF THE DRAWINGS

Figure 1:
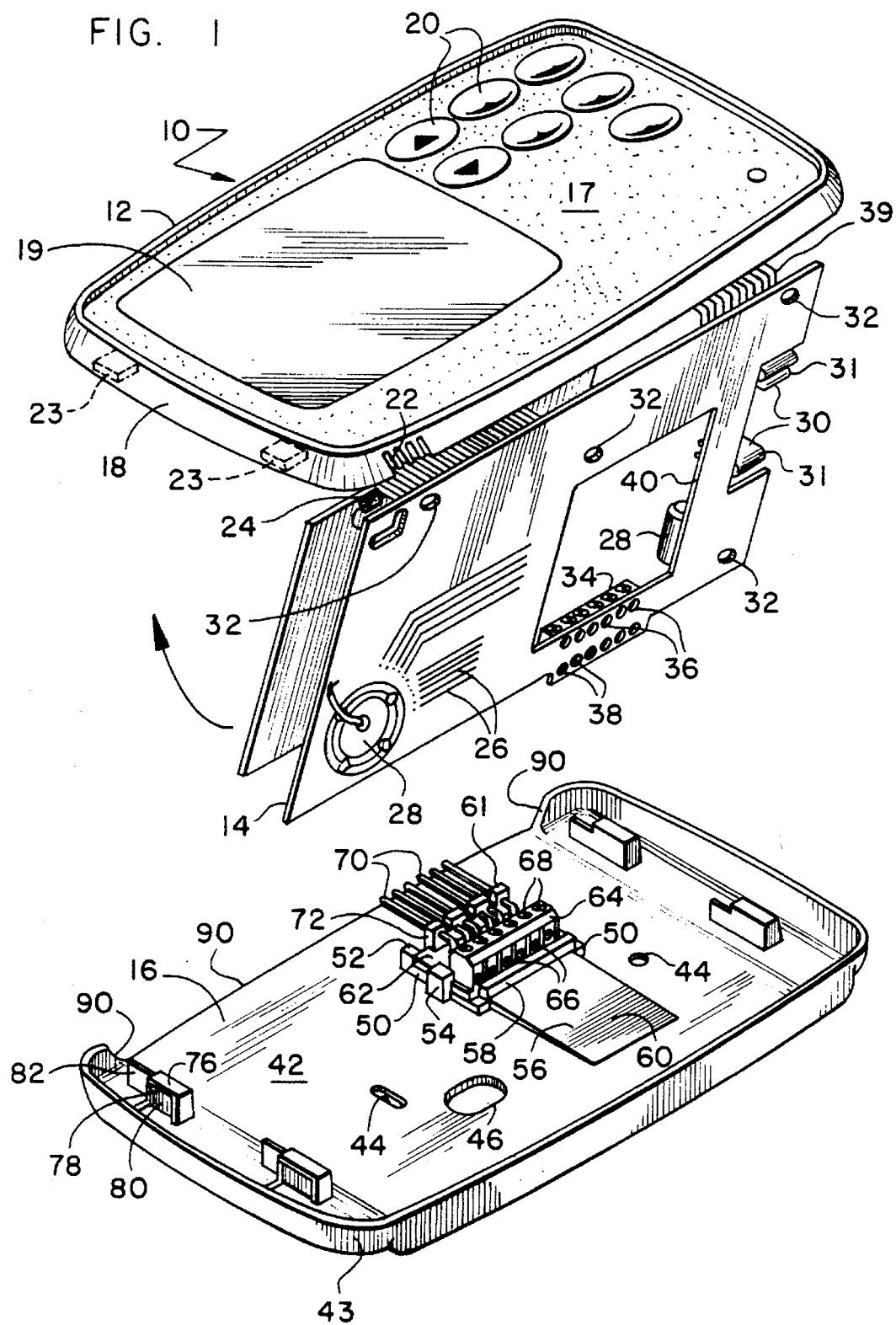
FIG. 1 is a perspective exploded view of a reduced profile thermostat in accordance with the present invention, including the thermostat cover, electronics board, and the subbase, including the mechanical and electric connectors.

The thermostat of the present invention is shown generally at 10 in FIG. 1. Thermostat 10 is comprised of three major sub-components. The sub-components are cover 12, electronics board 14, and subbase 16.

Cover 12 is formed of a planar portion 17 with a perimeter lip 18 formed thereon. Planar portion 17 comprises the front face of thermostat 10. Perimeter lip 18 forms a portion of the side of thermostat 10 in cooperation with a portion of subbase 16 when cover 12 is brought into registry with subbase 16, as will be further explained.

Cover 12 includes a display screen 19 that is typically a liquid crystal display. Display 19 is utilized to present symbols representing selected parameters to the operator of thermostat 10. Cover 12 additionally includes a desired number of touch controls 20. Controls 20 are typically utilized by the operator to program thermostat 10 for parameters, such as the desired temperature range and times of temperature set point shift.

Perimeter lip 18 of cover 12 includes a grill opening 22. Grill opening 22 is designed to provide for the free passage of room temperature air to the interior space of thermostat 10. Perimeter lip 18 defines a substantially bowl shaped space within cover 12. Such space substantially surrounds electronics board 14 when electronics board 14 is affixed to cover 12.

Perimeter lip 18 additionally includes inwardly directed mechanical tab connectors 23 formed on the inner side of perimeter lip 18. Mechanical tab connectors 23 are shown in phantom in FIG. 1. Tab connectors 23 are formed integral with perimeter lip 18 during the formation of cover 12. Tab connectors 23 are affixed at a first end to perimeter lip 18, thereby supporting tab connectors 23 in a cantilever manner. In a preferred embodiment, tab connectors 23 are generally rectangular in shape and extend inwardly from perimeter lip 18 substantially parallel to planar surface 17. Tab connectors 23 are designed with a desired resilience, such that tab connectors 23 may be forcibly deflected from the rest position and will return to the rest position when the force is removed. Not shown in FIG. 1 are the two substantially identical tab connectors 23 formed on the opposite side of cover 12, such that in a preferred embodiment, cover 12 includes four inwardly directed tab connectors 23.

Electronics board 14 is formed of a non-conducting substrate suitable for the inclusion of electric conducting strips integral therewith. Electronics board 14 includes a sensor 24 mounted thereon. Sensor 24 is typically a thermistor type sensor for sensing the temperature of the room in which thermostat 10 is mounted. The location of sensor 24 is selected to plate sensor 24 approximate to grill opening 22.

Electronics board 14 has selected electronic components 28 mounted thereon. Electronic components 28 are electrically connected by ribbon connectors 26. The majority of the electronic components 28 that protrude from the surface of electronics board 14 are mounted on the side of electronics board 14 that faces the inner side of cover 12. Such mounting contributes to the overall reduction of profile of thermostat 10 by permitting the electronics board 14 to disposed very close to the subbase 16 when cover 12 is brought into registry with subbase 16.

Electronics board 14 additionally includes auxiliary power receptacle 30. Auxiliary power receptacle 30 is comprised of opposed compressive leads 31 designed to engage and retain a battery therein. Mounting holes 32 are selectively positioned about electronic board 14 to facilitate the affixing of electronics board 14 to cover 12.

A receiver connector block 34 is mounted on electronics board 14. Receiver connector block 34 is mounted on the side of electronics board 14 that faces the inner side of cover 12. Connector block 34 includes receiver connectors 36. Receiver connectors 36 have conductive elements that are designed to surround and compressively engage a later described bayonet type connector. In a preferred embodiment, receiver connectors 36 are arrayed side by side in a relationship that forms a plane parallel to planar surface 17 of cover 12. Receiver connector block 34 is both electrically and mechanically coupled to electronics board 14 by solder connectors 38 and functions as a component in relaying power and communications between the HVAC system and thermostat 10. Electronic components 28 are electrically connected to the strip connectors 26 formed integral with electronics board 14. The electronic components 28 and strip connectors 26 are electronically connected to display 19 and touch controls 20 by flexible ribbon connectors 39 that extend between electronics board 14 and cover 12.

A connector port 40 is defined in the electronics board 14. Connector port 40 is a rectangular shaped port that provides an opening in electronics board 14. Connector port 40 is designed to accommodate the projection of certain components that are mounted on subbase 16 through electronics board 14 in order to reduce the profile of thermostat 10, as will be later detailed. Receiver connector block 34 is positioned approximate an edge of the perimeter of connector port 40.

Subbase 16 is preferably formed in a single process from a polymeric material. Such processes are well known in the industry and provide for the simultaneous formation of the various portions of subbase 16, as will be described. Subbase 16 has a mounting structure 42. Mounting structure 42 has an inner surface and a generally opposed back surface. The back surface is designed to be mounted conformal with a wall surface on which thermostat 10 is installed. Preferably, the back surface of mounting structure 42 and the wall surface define rectilinear planes. The inner surface of mounting structure 42 is designed for the mounting of selected electronic components thereon.

Subbase 16 additionally has a peripheral lip 43 that is disposed peripheral to mounting surface 42. Peripheral lip 43 is designed to cooperatively abut peripheral lip 18 of cover 12 when cover 12 is in its installed position with respect to subbase 16 to form a housing of thermostat 10.

Two mounting holes 44 are formed in mounting structure 42 of subbase 16. Mounting holes 44 accommodate conventional attachment devices for attaching thermostat 10 to a wall surface. Such attachment devices include, for example, a bolt threaded into an anchor, the anchor having been press fit in a bore formed in the wall. Mounting structure 42 additionally includes wiring port 46. Wiring port 46 is provided in order to bring the wiring leads for power and control of HVAC system to the interior of thermostat 10. Typically such wiring is run behind the wall surface on which thermostat 10 is mounted and then brought into thermostat 10 via a hole formed in the wall. There are typically several pairs of such wiring. In the preferred embodiment, provision is made for three such pairs of wiring.

A pair of opposed mounting blocks 50 are formed on mounting structure 42 of sub-base 16. Mounting blocks 50 have a mounting surface that is elevated above mounting structure 42 and is generally parallel thereto. Mounting block 50 is formed with a stop block 52 at an end thereof, the stop block 52 being raised above the mounting surface of the mounting block 50.

A pair of opposed mounting posts 54 are formed adjacent to the mounting blocks 50. Mounting posts 54 are L-shaped with the upper portion of the L extending over and spaced apart from the mounting surface of mounting block 50.

A retainer 56 is formed at the end of the mounting blocks 50 that is opposite to stops 52. Retainer 56 has a lip 58 supported by a biasing panel 60. Biasing panel 60 is formed integral with mounting structure 42. Biasing panel 60 is cut along three sides, thereby separating biasing panel 60 from mounting structure 42, and is affixed to mounting structure 42 along the fourth side. Biasing panel 60 is biased to project above mounting structure 42. In its normal rest position, biasing panel 60 lifts lip 58 to a position that is approximately co-planar with upper surface of stop 52. Retainer 56 is designed with a desired resilience that permits retainer 56 to be depressed such that lip 58 may be momentarily held below the level of mounting block 50. Upon release, retainer 56 returns to its rest position.

A bayonet connector unit 61 is held loosely in place on the mounting surface of the mounting blocks 50. Bayonet connector unit 61 is mounted on a base 62. Base 62 is formed of a nonconductive material of the same type used in the construction of electronics board 14 and includes electrical connector strips formed integral therewith. Base 62 is held in place on the mounting surface of the mounting blocks 50 by mounting blocks 50, stops 52, mounting post 54, and lip 58.

A terminal 64 is mounted on base 62. Terminal 64 includes cylindrical wiring lead connectors 66 designed to receive the ends of the power and communication wires brought in through wiring port 46. In the preferred embodiment, there are six such wiring lead connectors 66. Set screws 68 are designed to compressively engage the ends of such wires after insertion into the lead connectors 66, thereby effecting the electrical connection of the wires and the connectors 66. Terminal 64 is retained on base 62 by soldered leads that pass through base 62. The soldered leads (not shown) electrically connect one lead connector 66 to a single bayonet connector 70 by means of the aforementioned electrical connector strips formed in base 62.

Bayonet connectors 70 are formed of a relatively rigid, metallic, conducting material. In a preferred embodiment, connectors 70 have a rectangular cross section. Bayonet connectors 70 are preferably formed with a ninety degree bend therein. The first and second ends of bayonet connectors 70 are directed ninety degrees with respect to one another. The first end (not shown) of bayonet connector 70 passes through base 62 and provides the electrical connection to terminal 64 as described above and are directed into the wall on which thermostat 10 is mounted. The second end of bayonet connectors 70 are arrayed as fingers in parallel and define a plane that is parallel to the plane of mounting structure 42 and the wall on which thermostat 10 is mounted. The second end of bayonet connectors 70 preferably project upward when thermostat 10 is mounted as desired on a wall.

The bayonet connectors 70 are designed to be compressively engaged within the receiver connectors 36 of receiver connector block 34. The bayonet connector unit 61 is held loosely in place as previously described in order to provide a small amount of lateral play therein to account for any slight misalignment between the bayonet connectors 70 and the receiver connectors 36. Bayonet connectors 70 are held semi-rigidly inplace by guide panel 72. Guide panel 72 is formed of a non conductive material and is bonded to the upper surface of base 62.

Subbase 16 includes four mechanical hook connectors 76. Mechanical hook connectors 76 are designed to cooperatively engage the mechanical tab connectors 23 formed in cover 12 and thereby hold cover 12 in position on subbase 16. In the preferred embodiment, mechanical hook connectors 76 include a hook 78. Hook 78 has a first end formed integral with subbase 16. Hooks 78 have a second end that define an opening. The openings formed by hooks 78 preferably all face in the same direction as the direction in which the second end of the bayonet connectors 70 are directed. The hooks 78 are strengthened by side panel support 80. Side panel support 80 includes a tapered guide ramp 82 that is directed away from the opening formed by hook 78.

Figure 2:
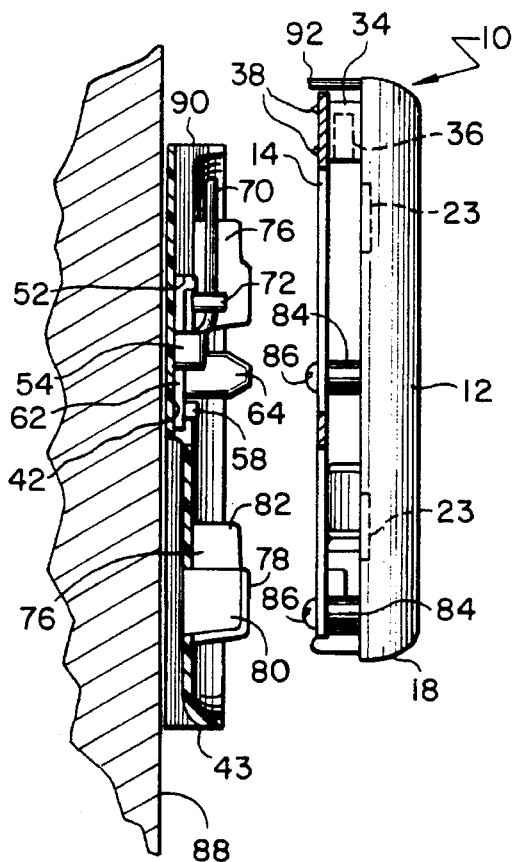
FIG. 2 is a side elevational view of the cover and electronics board positioned above the subbase in the offset position prior to engagement of the mechanical and electric connectors.

Referring now to FIG. 2, two features of thermostat 10 that have not been previously discussed are depicted. Electronics board 14 is depicted being mounted to cover 12. Electronics board 14 is spaced apart from cover 12 by mounting to posts 84 formed integral with cover 12. Electronics board 14 is held to posts 84 by screws 86, screws 86 passing through the previously described mounting holes 32 defined in electronics board 14 to threadingly engage posts 84.

FIG. 2 depicts subbase 16 mounted flush with the surface of wall 88. The depiction of FIG. 2 illustrates the preferred orientation of subbase 16 when mounted on a wall surface 88. The second end of bayonet connectors 70 project upward and the opening formed by the hook 78 of each of the mechanical connectors 76 is likewise upwardly directed. The plane formed by the array of bayonet connectors 70 is parallel to the plane of mounting structure 42 of subbase 16 and also of the plane formed by wall 88.

Cover 12 is shown spaced apart from subbase 16 and elevated slightly above subbase 16. This position is the pre-engagement position of cover 12 with respect to subbase 16. The openings of receiver connectors 36, shown in phantom, are downwardly directed ready to engage the upwardly directed bayonet connectors 70 in order to make electrical connection between components mounted on cover 12 and components mounted on subbase 16. Likewise, the mechanical tab connectors 23, shown in phantom, are positioned ready to engage the undersides of the hooks 78, thereby making mechanical connection between cover 12 and subbase 16 to define the housing of thermostat 10.

Figure 3:
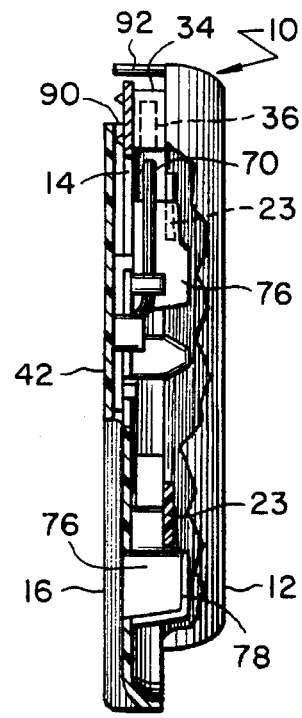
FIG. 3 is a side elevational view of the cover and electronics board positioned on the subbase in the offset position with the mechanical and electric connectors of the present invention depicted in the aligned position immediately prior to engagement thereof, with parts cut away for clarity.

FIG. 3 depicts the intermediate engaging position of cover 12 with respect to subbase 16. In this intermediate position, cover 12 has been moved to the left as compared to the depiction of FIG. 2. This action brings bayonet connectors 70 through connector port 40 defined in electronics board 14, thereby aligning bayonet connectors 70 with receiver connectors 36 conformal with the back surface of the mounting structure 42 of subbase 16. The correct alignment of cover 12 with respect to subbase 16 is effected by mechanical tab connectors 23 riding on the guide ramps 82 of mechanical hook connectors 76. As depicted, the mechanical tab connectors 23 are poised just at the opening formed by the hooks 78 of mechanical hook connectors 76.

Figure 4:
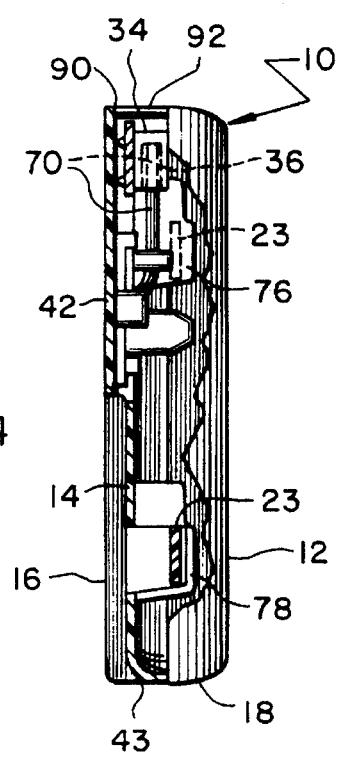
FIG. 4 is a side elevational view of the cover and electronics board engaged with the subbase and depicting the mechanical and electric connectors of the present invention in engagement, with parts cut away for clarity.

FIG. 4 depicts the fully engaged position of cover 12 with respect to subbase 16, forming the reduced profile housing of thermostat 10. As compared to the intermediate engaged position depicted in FIG. 3, the depiction of FIG. 4 illustrates cover 12 moved downward with respect to subbase 16. Such motion is conformal with the back surface of the mounting structure 42 of subbase 16. Where the back surface of the mounting structure 42 of subbase 16 and the surface of the wall on which the thermostat are mounted define rectilinear planes, such motion is in a plane that is parallel to the plane defined by the back surface of the mounting structure 42 of subbase 16.

The above described downward motion requires a considerable force in order to firmly engage cover 12 to subbase 16 both electrically and mechanically. Electrical connection is made by the projection of bayonet connectors 70 into receiver connectors 36. Receiver connectors 36 are designed to tightly engage bayonet connector 70 in order to ensure a good electrical connection therebetween. Likewise, mechanical tab connectors 23 are designed to be in slight flexure when in engagement with the underside of hook connectors 78. The relative position of hook connectors 78 with respect to mechanical tab connectors 23 ensures that in engagement, the underside of hook connector 78 is always exerting a tensioning, flexing force on mechanical tab connector 23. This force ensures a firm mechanical connection between cover 12 and subbase 16.

In the fully engaged position depicted in FIG. 4, the lip 43 of subbase 16 is in cooperative engagement with lip 18 of cover 12. The reaction to the aforementioned force between mechanical tab connectors 23 and the underside of hook connector 78 acts to create a substantially tight housing for thermostat 10. It should be noted that upwardly directed pressure on cover 12 will readily disengage cover 12 from sub-plate 16 both electrically and mechanically, thereby permitting the removal of cover 12 from subbase 16. This ease of removal permits maintenance actions to be performed on the electronic components of electronics board 14 or replacement of the electronics board 14 without disturbing the electrical connections of the power and communications wiring that are made at terminal 64 of the bayonet connector unit 61.

FIG. 4 depicts the reduced profile of thermostat 10 that is made possible by effecting the electrical and mechanical connections between cover 12 and subbase 16 by motion that is conformal to the back surface of mounting structure 42 of subbase 16 and to the wall 88 on which thermostat 10 is mounted. It is also noted that electronics board 14 is disposed in close proximity to subbase 16. This is made possible in part permitting bayonet connector unit 61 to project through connector port 40 such that bayonet connectors engage receiver connectors 36 on the side of electronics board 14 that faces the cover 12. It is also made possible in part by a gap 90 in the peripheral lip 43 of the subbase 16. The gap 90 is closed and sealed by an extension 92 in the perimeter lip 18 of the cover 12 as best shown in FIGS. 2 through 4. This reduced profile is made possible without sacrificing any of the flexibility that results from having the power and communication wires connected to the bayonet connector unit 61 mounted to subbase 16 and the electronic components on electronics board 14 mounted to cover 12 and by aligning the electrical bayonet and receiver connectors 70, 36 with the planar portion 17 of the cover 12. Additionally, the effects of the projection of the bayonet connectors 70 is reduced by providing the connector port 40 in the electronics board 14.

While the present invention has been described in the context of a preferred embodiment, it is also appreciated that there are many modifications and variations that are within the scope of the present invention so that its breadth should in no way be limited other than by the claims that follow.

What is claimed is:

1. A thermostat having a reduced profile designed to control the temperature in an area and having selected components for sensing the temperature and for communicating between an operator and a HVAC system, comprising:

a subbase having a back surface designed to be mounted conformally on a surface and an opposed inner surface having a portion of the selected components or effecting control mounted thereon, such components portion including a first electrical connection, and a first mechanical connection operably coupled thereto;

a cover having a front face designed to carry selected components for communication with the operator and an opposed inner surface having a portion of the selected components for effecting control supported thereby, said portion of the selected components for effecting control including a second electrical connection, and the inner surface having a second mechanical connection operably coupled thereto, wherein the cover is brought into registry with the subbase to form a thermostat housing having a reduced profile that substantially encloses the sensing and communicating components of the thermostat, the first electrical connection being mated with the second electrical connection and the first mechanical connection being mated to the second mechanical connection by motion of the cover with respect to the subbase that is substantially conformal with the back surface of the subbase as the cover is brought into registry with the subbase;

wherein the first electrical connection and the second electrical connection comprise an oppositely directed receiver connector and a bayonet connector respectively, the receiver connector receiving the bayonet connector therein and making electrical connection therewith and the bayonet connector being received within the receiver connector means in compressive sliding engagement therewith;

wherein the receiver connector and the bayonet connector comprise a plurality of individual receiver connectors and a corresponding number of individual bayonet connectors; and wherein the individual bayonet connectors taken together comprise a set of spaced apart engaging fingers, the fingers designed to electrically engage a corresponding receiver connector and being oriented in a parallel array that is substantially conformal with the back surface of the subbase.

2. A thermostat as claimed in claim 1 the thermostat being communicatively connected by a plurality of wires to the HVAC system, and further including a terminal block that is operably coupled to the subbase, the terminal block having terminals disposed thereon designed for connecting to the wires to, the HVAC system, the bayonet connectors being operably, supportively coupled to the terminal block and each such bayonet connector being selectively electrically coupled to at least one of such terminals.

3. A thermostat as claimed in claim 2 wherein the engaging fingers of the bayonet connectors comprise a first end of such bayonet connectors, the bayonet connectors having a second end being electrically coupled to at least one of such terminals, the bayonet connectors defining a bend therein such that the second end thereof is oriented at substantially a right angle with respect to the first end thereof.

4. A thermostat as claimed in claim 3 further including an electronics board being operably coupled to the inner surface of the cover and having a component bearing surface oriented to face the cover and including a connector port defined therein, the connector port being defined by a perimeter, the receiver connectors being operably coupled to the component bearing surface of the electronics board and disposed proximate the perimeter of the connector port.

5. A thermostat as claimed in claim 4 wherein the bayonet connectors project through the connector port to engage the receiver connectors when the cover is brought into registry with the subbase.

6. A thermostat as claimed in claim 5 wherein the first and second mechanical connections comprise a plurality of hook and tab connector sets.

7. A thermostat designed to control the temperature in an area, comprising:

a subbase forming a first portion of a thermostat housing and defining a back surface designed to be conformally mounted on a surface and having a first electrical connection and a first mechanical connection operably coupled thereto; and a cover forming a second portion of a thermostat housing and having a second electrical connection operably coupled thereto for mating with the first electrical connection and a second mechanical connection operably coupled thereto for mating with the first mechanical connection;

wherein the first and second electrical connections and the first and second mechanical connections are oriented such that motion of the cover substantially conformal to the back surface of the subbase brings the cover into registry with the subbase and effects the releasable engagement of the first and second electrical connections and effects the releasable engagement of the first and second mechanical connections;

wherein the first electrical connection and the second electrical connection comprise an oppositely directed receiver connector and an bayonet connector means respectively, the receiver connector receiving the bayonet connector therein and making electrical connection therewith and the bayonet connector being received within the receiver connector in compressive sliding engagement therewith;

wherein the receiver connector and bayonet connector comprise a plurality of individual receiver connectors and a corresponding number of individual bayonet connectors;

wherein the individual bayonet connectors taken together comprise a set of spaced apart engaging fingers, the fingers designed to electrically engage a corresponding receiver connector and being oriented in a parallel array being substantially conformal with the back surface of the subbase.

8. A thermostat as claimed in claim 7, being designed to control a HVAC system, the thermostat being communicatively connected by a plurality of wires to the HVAC system, and further including a terminal block that is operably coupled to the subbase, the terminal block projecting from the subbase in a direction generally perpendicular to the subbase, the terminal block having terminals disposed thereon designed for connecting to the wires to the HVAC system, the bayonet connectors being operably, supportively coupled to the terminal block and each such bayonet connector being selectively electrically coupled to at least one of such terminals.

9. A thermostat as claimed in claim 8 wherein the engaging fingers of the bayonet connectors comprise a first end of such bayonet connectors, the bayonet connectors having a second end being electrically coupled to at least one of such terminals, the bayonet connectors defining a bend therein such that the second end thereof is oriented at substantially a right angle with respect to the first end thereof.

10. A thermostat as claimed in claim 9 further including an electronics board being operably coupled to the cover and having a component bearing surface oriented to face the cover and including a connector port defined therein, the connector port being defined by a perimeter, the receiver connectors being operably coupled to the component bearing surface of the electronics board and disposed proximate the perimeter of the connector port.

11. A thermostat as claimed in claim 10 wherein the terminal block projects into the connector port when the cover is placed in an intermediate engagement position relative to the subbase, the bayonet connectors being aligned with but not in substantial engagement with the receiver connectors.

12. A thermostat as claimed in claim 11 wherein the bayonet connectors project through the connector port to engage the receiver connectors when the cover is brought into registry with the subbase.

13. A thermostat as claimed in claim 12 wherein the first and second mechanical connections comprises a plurality of hock and tab connector sets.

14. A thermostat as claimed in claim 12 wherein the subbase includes a peripheral lip having a gap and the cover includes a perimeter lip having an extension, wherein the registry of the cover with the subbase places the extension in sealing engagement with the gap.

15. A method of installing a reduced profile thermostat having a cover and a subbase where the cover and subbase each have electrical and mechanical connections oriented for connection in a direction parallel to a back surface of the subbase, the method comprising the steps of:

positioning the cover spaced apart from and elevated slightly above the subbase;

moving the cover downwardly to align the mechanical and electrical connections on the cover with the mechanical and electrical connections on the subbase; and moving the cover in a direction parallel to the plane of the back surface so as to engage the cover and subbase mechanical and electrical connections.

\* \* \* \* \*